J. M. DODGE.
SPROCKET WHEEL.
APPLICATION FILED NOV. 23, 1908.
954,939.
Patented Apr. 12, 1910.
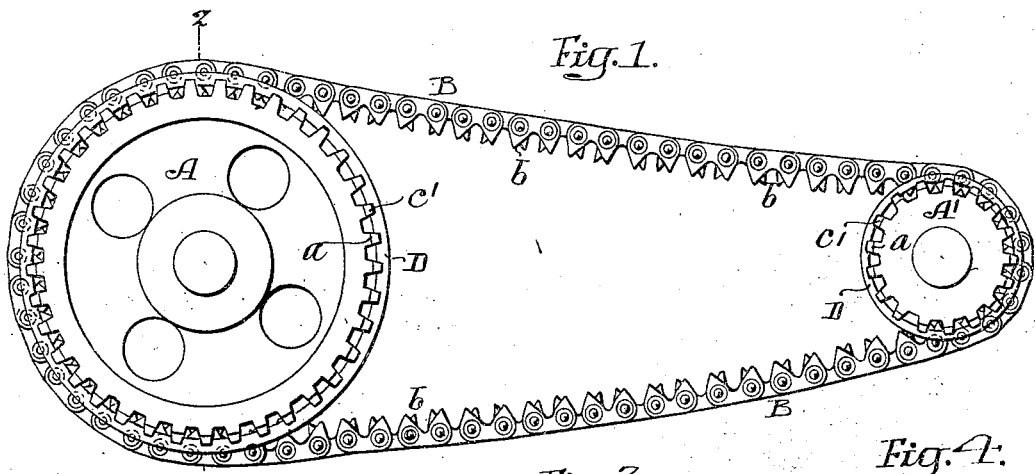
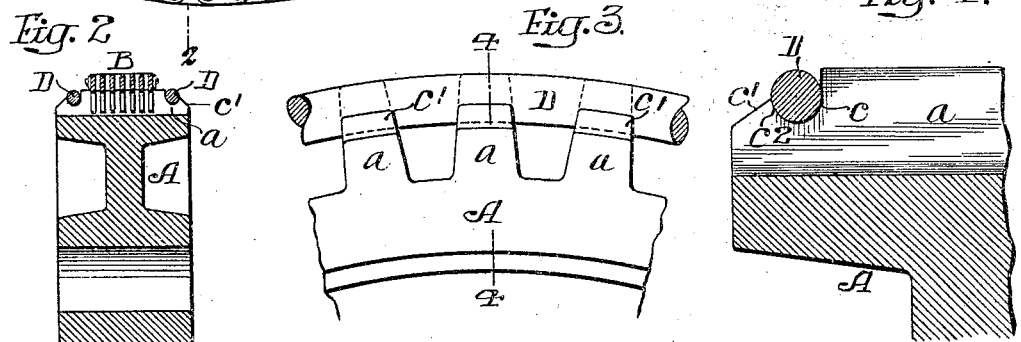
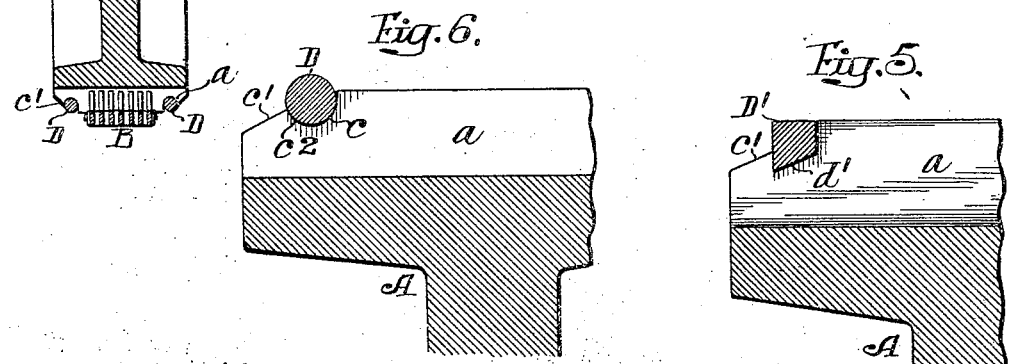
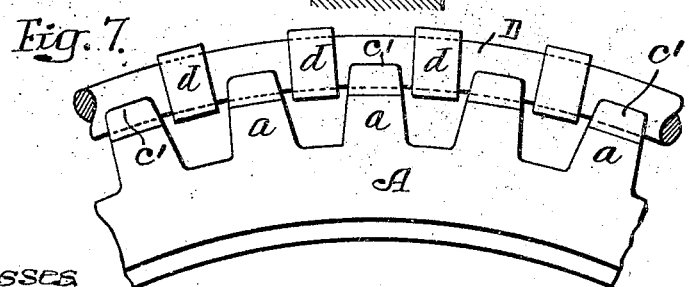
Witnesses
Titus H. Irons
Wills H. Burrowes
Inventor:
James M. Dodge.
by his Attorneys.

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

SPROCKET-WHEEL.

954,939.

Specification of Letters Patent.

Patented Apr. 12, 1910.

Application filed November 23, 1908. Serial No. 464,131.

*To all whom it may concern:*

Be it known that I, JAMES M. DODGE, a citizen of the United States, residing in Philadelphia, Pennsylvania, have invented certain Improvements in Sprocket-Wheels, of which the following is a specification.

My invention relates to certain improvements in sprocket wheels adapted for drive chains having teeth which engage the teeth of the wheel.

The object of my invention is to provide flanges for the wheel so as to prevent the chain from slipping off the wheel. This object I attain in the following manner, reference being had to the accompanying drawing, in which:—

Figure 1, is a side view showing two sprocket wheels and the drive chain; Fig. 2, is a sectional view on the line 2—2, Fig. 1; Fig. 3, is an enlarged side view of a portion of the wheel illustrating my improved flange; Fig. 4, is a transverse sectional view on the line 4—4, Fig. 3; Figs. 5 and 6 are views illustrating modifications of the invention and Fig. 7, is a view showing rollers mounted on the flange for taking the wear on the chain.

A, A' are two sprocket wheels, in the present instance of different diameters, each having teeth $a$ and each sprocket wheel is made identical with the other. Adapted to the sprocket wheels is a drive chain made up of links pivoted together and having teeth $b$ which mesh with the teeth of the sprocket wheels. This is the well known form of silent chain and heretofore the usual practice has been to provide either one or both of the wheels with flanges made of flat bands secured to the side of the wheel by bolts or rivets. This band is a permanent fixture and it materially increases the cost of the wheel and, as the surface of the band is wide, the side friction of the chain against the flange is considerable.

By my invention I reduce the cost of manufacture, provide a simple guard which can be readily applied and which will answer the purpose as well as the ordinary wide flange alluded to above.

I cut channels $c$ in the face of each tooth near each edge as illustrated in Fig. 4, and preferably taper each end of the tooth at $c'$. The guard is made in the form of a hoop D; the hoop being preferably made from a piece of round wire, the ends of which are welded together, and this hoop is of a diameter equal to the diameter of the slotted portion $c$ of the wheel. The hoop is then forced over the ends $c^2$ of the teeth, the inclined surface $c'$ forming a guide and the metal of the hoop is expanded as pressure is applied so that it will pass over the highest point of the portion $c^2$ and spring into the grooves $c$ and will be retained in position by the projecting portion $c^2$ of each tooth. Thus I provide a guard flange which will have the least amount of frictional surface and which will retain the chain properly in position on the wheel.

In some instances it may not be necessary to form the projection $c^2$ on each tooth as this portion may be cut away from every other tooth, or as many teeth as desired. There must, however, be a sufficient number of projections to hold the flange rigidly in position.

While I have shown in Fig. 1, both the driving and driven wheels provided with the flanges, in some instances only one wheel may be provided with flanges, the other being perfectly plain as heretofore.

The grooves $c$ are usually made of such depth that the upper surface of the wire D will be on a line with the ends of the teeth, although the groove may be made as shown in Fig. 6, in which the wire D will extend beyond the ends of the teeth, and when it is found necessary, particularly on large size wheels, antifriction rollers $d$ may be mounted on the wire flanges between the teeth, as shown in Fig. 7.

In place of forcing the wire hoop D over the projections and expanding the metal of the hoop, the hoop may be made of such diameter that it will readily pass over the projections and can be shrunk upon the wheel when in position, so as to fit snugly in the grooves.

While I prefer to make the wire hoop round in cross section, it may be of any shape desired. In Fig. 5, I have shown the wire D with a beveled inner surface $d'$ so that it can be forced over the beveled surface at the ends of the teeth and engage the corresponding groove in the teeth of the wheel.

The hoop D may be made in a single piece having the ends permanently secured together as above described, or the ends may be detachably secured, or the hoop may be made in two or more pieces as fully set forth and claimed in an application for patent filed by me of even date herewith Serial No. 464,132.

It will be seen that by making the guard as shown, the space between the teeth is open at each end, thus preventing the accumulation of dirt on the wheel.

I claim:—

1. The combination of a wheel having teeth on its periphery, the teeth being channeled near each end leaving projections on the teeth beyond the grooves, said projections being less in height than the body of the teeth, the outer face of the projections being beveled, and endless hoops mounted in the channels.

2. The combination of a wheel having teeth on its periphery, guards clamped upon the wheel and resting on the teeth, with anti-friction rollers mounted on the guards between the teeth.

In testimony whereof, I have signed my name to this specification, in the presence of two subscribing witnesses.

JAMES M. DODGE.

Witnesses:
 WM. A. BARR,
 JOS. H. KLEIN.